Jan. 3, 1928.

H. C. HOLMES

WATER HEATER

Filed May 12, 1927

1,654,935

INVENTOR.
Harry C. Holmes
BY
ATTORNEY

Patented Jan. 3, 1928.

1,654,935

UNITED STATES PATENT OFFICE.

HARRY C. HOLMES, OF MANOR, PENNSYLVANIA.

WATER HEATER.

Application filed May 12, 1927. Serial No. 190,708.

My invention relates to water heaters primarily used for heating water for domestic purposes, and important objects of the invention are to provide a water heater of the character described, which utilizes the products of combustion of the heating element for heating the water, which provides for the supply of water to the water tank with a minimum of agitation, and which may be readily installed or connected to a heating system already installed, as well as form a component part of a new water heating system.

Further objects of the invention are to provide a heating apparatus of the type stated, which is simple in its construction and arrangement, strong, durable and efficient in its use, compact, positive in its action, and comparatively inexpensive to manufacture, install and operate.

With the foregoing and other objects in view which will appear as the description proceeds, the invention resides in the combination and arrangement of parts and in the details of construction hereinafter described and claimed, it being understood that changes in the precise embodiment of the invention hereinafter disclosed can be made within the scope of what is claimed without departing from the spirit of the invention.

In the drawing wherein like numerals of reference designate corresponding parts throughout the several views:—

Figure 1:
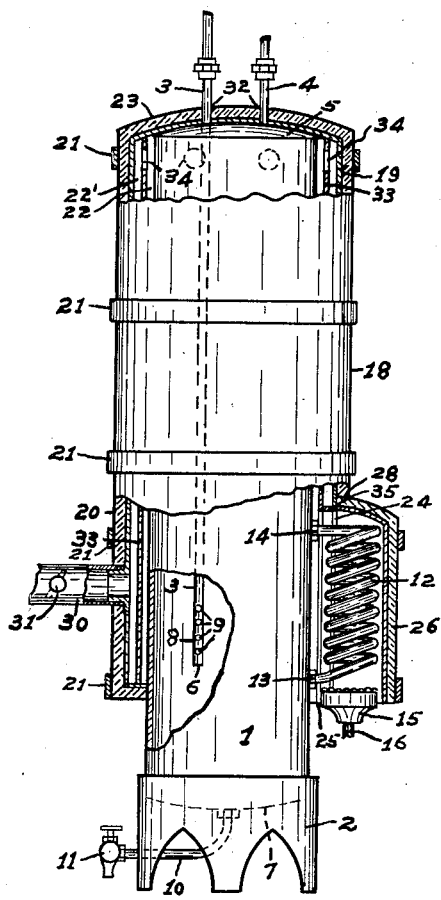
Figure 1 is a side elevational view, partly in section, of a water heater constructed in accordance with the invention.
Figure 2:
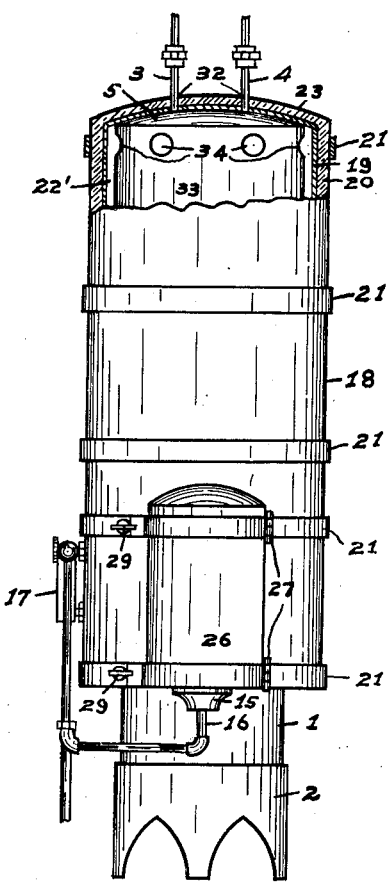
Figure 2 is a front elevational view thereof.

Referring in detail to the drawing 1 denotes an elongated cylindrical and closed hot water tank of the usual construction. The tank 1 is supported in the vertical position on a suitable base 2, and is provided with a cold water inlet pipe 3 and a hot water outlet pipe 4.

The hot water outlet pipe 4 is fixed to the top 5, of the tank 1, and communicates with the upper end of the latter. The cold water inlet pipe 3 is also fixed to the tank top 5 but depends into the tank 1. The lower end 6, of the inlet pipe 3, is closed, and is spaced or disposed at some distance from the bottom 7, of the tank 1.

The lower end portion 8, of the inlet pipe 3, is formed with a plurality of laterally disposed apertures 9, so that the water on issuing from the latter will be directed to enter the tank 1 in a horizontal direction, thereby preventing the liability of agitating or riling the sediment accumulations deposited on the tank bottom 7. In the usual construction the lower end of the water inlet pipe is disposed close to the bottom of the tank and is open, allowing the water to enter the latter in the vertical direction, thereby disturbing the sediment accumulations deposited on the tank bottom. The tank bottom 7 carries a drain pipe 10 provided with a drain valve 11 for draining the tank 1, in the usual manner, when required.

The heating coil 12 is fixedly supported at the side of the tank 1 and has its inlet and outlet ends communicably connected to the latter, as respectively indicated at 13 and 14. The heating coil 12 extends vertically, and the lower end thereof is disposed approximately in horizontal alignment relatively to the lower end 6, of the water inlet pipe 3. The heating coil 12 is heated by a fuel burner 15, of any suitable construction. The burner 15 is disposed at the lower end of the heating coil 12, and is provided with a fuel supply pipe 16 and automatic thermostatic control 17.

Enclosing the entire tank 1, with the exception of the lower end portion thereof, is an annular jacket 18, which is composed of an inner shell 19, of sheet metal, provided with a heat-insulating cover 20. The latter is constructed from asbestos, or any other suitable material impervious to the penetration of heat, and is held in place by a plurality of circumferential bands 21, or in any other suitable manner.

The jacket 18 is supported on the tank 1, by seating the top 23, of the former, on the top 5, of the latter. The lower end of the jacket 18 is preferably disposed in horizontal alignment with the lower end of the heating coil 12. The jacket 18 is spaced from the side wall of the tank 1 and further includes a fixed, inwardly disposed sheet metal partition cylinder 33 which provides an inner heat chamber 22 and an outer exhaust chamber 22' between the shell 19 and the tank 1. The upper end of the partition cylinder 33 is formed with a plurality of apertures 34, which are arranged circumferentially and for the purpose to be described.

The lower end portion of the jacket 18 and of the partition cylinder 33 are formed with registering cut out portions 24 which are open at their lower end, as indicated at 25. The cut out portion 24 is disposed at the inner side of the heating coil 12, as clearly shown in Figure 1.

The heating coil 12 is enclosed by a coil casing 26. The latter is preferably constructed from the combination of the same materials from which the jacket 18 is constructed, and is hingedly connected to the jacket 18 by a pair of hinges 27. When the coil casing 26 is in the closed position it interengages with the jacket 18, as indicated at 28, and completely covers the heating coil 12 and the cut out portion 24, with the exception of the lower ends thereof. The coil casing 26 is maintained in the closed position by suitable latching members 29.

A flue pipe 30, provided with a regulator 31, is carried by the jacket 18 and communicates with the outer chamber 22'. The flue pipe 30 is preferably disposed diametrically opposite to the heating coil 12.

The jacket top 23 is formed with a pair of apertures 32 for the passage of the water inlet pipe 3 and the water outlet pipe 4. In positioning the jacket 18 on the tank 1, or when removing the former from the latter, it is only necessary to disconnect the water inlet pipe 3 and the water outlet pipe 4. The jacket cut out portion 24 provides clearance for the attached ends 13 and 14, of the heating coil 12, to permit of the positioning or removal of the jacket 18, in the manner stated.

The coil casing 26, in conjunction with that portion, of the tank 1, which registers with the jacket cut out portion 24, constitutes the combustion chamber of the device, and houses the heating coil 12 and the burner 15, the latter being arranged in the lower open end of the coil casing 26.

The edges of the shell 19 and of the partition cylinder 33, which surround the cut out portion 24 are joined by a wall 35, thereby closing off the entrance to the exhaust chamber 22' through the cut out portion 24.

The products of combustion, including all hot air, gases, and fumes developed by the burning fuel, and emanating from the heating coil 12, will enter the heat chamber 22, through the jacket cut out portion 24, and ascend in the heat chamber 22, in contact with the surface of the tank 1. On reaching the top of the heat chamber 22, the products of combustion will enter the exhaust chamber 22', through the apertures 34, and descend in the chamber 22' until dissipated through the flue 30.

The utilization of the heat generated by the burning fuel and of the heating coil 12, in the manner stated, will provide a highly efficient water heater with a minimum of fuel consumption.

What I claim is:

1. In combination, a water heater comprising a tank; a conduit, through which the water to be heated is conducted, depending into said tank, and having its lower end spaced from the bottom of the latter; said conduit having its lower end closed and further provided with a plurality of horizontally extending outlets formed in the side wall of the lower end portion thereof; a heating element, including a fuel burner, for heating the water in said tank; a jacket surrounding said tank and providing an inner heating chamber and an outer exhaust chamber surrounding said tank; means for establishing communication between said inner heating chamber and said outer exhaust chamber at the upper ends thereof; the lower end portion of said jacket formed with a cut out portion; said heating element disposed in said cut out portion and communicating with the said inner heating chamber; a casing enclosing said heating element and hingedly connected to said jacket; and a flue member communicating with said outer exhaust chamber.

2. In combination, a water heater comprising a tank; a conduit, through which the water to be heated is conducted, depending into said tank, and having its lower end spaced from the bottom of the latter; said conduit having its lower end closed and further provided with a plurality of horizontally extending outlets formed in the side wall of the lower end portion thereof; an automatically regulated heating element, including a fuel burner, for heating the water in said tank; a jacket surrounding said tank and providing an inner heating chamber and an outer exhaust chamber surrounding said tank; said jacket being detachably supported by said tank; means for establishing communication between said inner heating chamber and said outer exhaust chamber at the upper ends thereof; the lower end portion of said jacket formed with a cut out portion; said heating element disposed in said cut out portion and communicating with the said inner heating chamber; a casing enclosing said heating element and hingedly connected to said jacket; and a flue member communicating with said outer exhaust chamber.

In testimony whereof I affix my signature.

HARRY C. HOLMES.